S. J. CLULEE.
OPHTHALMIC MOUNTING.
APPLICATION FILED AUG. 25, 1920.

1,362,577.

Patented Dec. 14, 1920.

INVENTOR.
Stephen J. Clulee
BY
Horatio E. Bellows
ATTORNEY

UNITED STATES PATENT OFFICE.

STEPHEN J. CLULEE, OF ATTLEBORO, MASSACHUSETTS, ASSIGNOR TO BAY STATE OPTICAL COMPANY, A CORPORATION OF MAINE.

OPHTHALMIC MOUNTING.

1,362,577.   Specification of Letters Patent.   Patented Dec. 14, 1920.

Application filed August 25, 1920. Serial No. 405,806.

*To all whom it may concern:*

Be it known that I, STEPHEN J. CLULEE, a citizen of the United States, residing at Attleboro, in the county of Bristol and State of Massachusetts, have invented certain new and useful Improvements in Ophthalmic Mountings, of which the following is a specification.

My invention relates to lens frames, and is particularly adapted to spectacle, eyeglass, and goggle frames for circular lenses. Such lenses comprise the cylindrical type, which have axes; and the spherical, periscopic, or plano type, which have no axes.

The principal objects of my invention are to prevent the accidental derangement of the axes of cylindrical lenses by rotation; to enable accurate and instantaneous assemblage and reassemblage of the axial lenses and frames; to attain these ends in an inexpensive manner and without material weakening of the frame rims; to provide a rotary preventing means equally adapted for cylindrical and spherical lenses without structural change, defacement, or bending of the rims, or any notching of the lens, when it is desired to replace a cylindrical lens by a spherical lens.

To the accomplishment of the foregoing and related objects my invention consists of the parts and combinations of parts hereinafter described and embraced within the scope of the claims.

Figure 1:
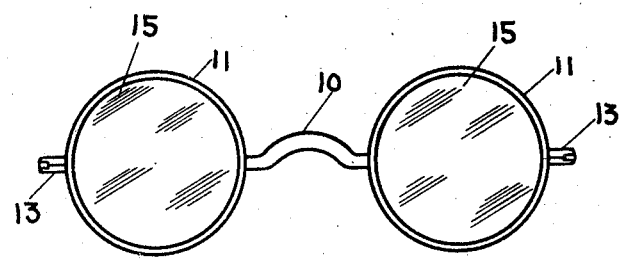
Figure 2:
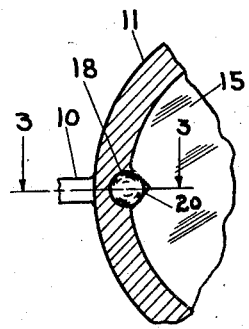
Figure 3:
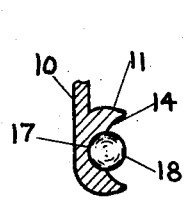
Figure 4:
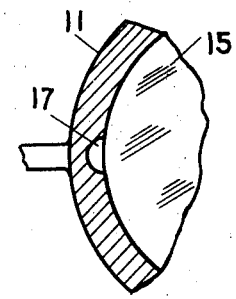
Figure 5:
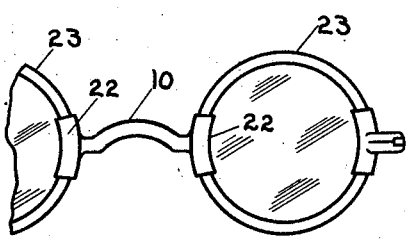
Figure 6:
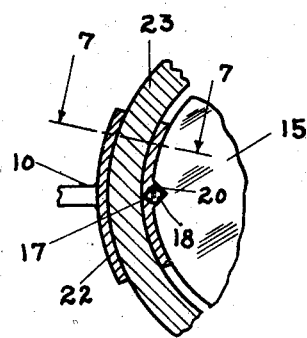
Figure 7:
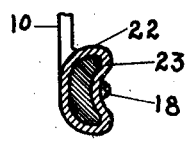

In the accompanying drawings illustrating the principles of my invention and the best mode now known to me of applying those principles, Figure 1 is a front elevation of a pair of spectacles or eyeglasses embodying my invention, Fig. 2, an enlarged longitudinal section of the portion thereof adjacent the bridge, Fig. 3, a section of the frame on line 3—3 of Fig, 2, Fig. 4, a section corresponding to that of Fig. 2 omitting the lens checking member, Fig. 5, a front elevation of a modified form of my invention, Fig. 6, a partial longitudinal section of a portion of the same, and Fig. 7, a section on line 7—7 of Fig. 6.

Like reference characters indicate like parts throughout the views.

In the construction illustrated 10 is the bridge, and 11 the metal rims or eye wires of the frame integral therewith carrying end pieces 13 and provided with annular grooves 14 for the circular lenses 15. Adjacent the ends of the bridge each rim is provided in its grooved face with a socket 17, in the present instance curved or substantially hemispherical in form. Resting in this socket is a removable independent locking or checking member 18. In this case the member is spherical in shape to fit the socket, and constitutes a ball, a portion of whose periphery extends outwardly beyond the face of the rim channel 14, but preferably not beyond the plane of the lateral edges of the rims.

In Fig. 2 is shown a circular cylindrical lens 15 provided with a notch or cavity 20 in its periphery adapted to receive the extended portion of the ball 18 whereby the lens is checked against rotation. In Fig. 4 the lens is of the plano type, for which reason the notch is omitted.

When it is desired to substitute in a rim a spherical in place of a cylindrical lens it is only necessary to allow the ball 18 to drop out of its seat, or to manually remove the same.

In. Figs. 5, 6 and 7 the rims comprise sleeves 22 on the bridge 10 embracing non-metallic portions 23. In this construction the sockets 17 and the balls 18 are preferably of less dimensions than when the entire rims are integral with the bridge.

I claim:—

1. In an ophthalmic mounting, lens rims provided with substantially hemispherical sockets, and balls resting in the sockets extending outwardly from the rims for engagement with lenses.

2. In an ophthalmic mounting, circular lens rims having internal peripheral grooves and provided with sockets within the grooves, and balls resting in the sockets adapted to engage notches in the lenses.

In testimony whereof I have affixed my signature.

STEPHEN J. CLULEE.